United States Patent
Nayar et al.

(10) Patent No.: US 8,595,721 B2
(45) Date of Patent: Nov. 26, 2013

(54) PRESERVING A DEDICATED TEMPORARY ALLOCATION VIRTUALIZATION FUNCTION IN A POWER MANAGEMENT ENVIRONMENT

(75) Inventors: Naresh Nayar, Rochester, MN (US); Karthick Rajamani, Austin, TX (US); Freeman L. Rawson, III, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 12/644,749

(22) Filed: Dec. 22, 2009

(65) Prior Publication Data

US 2011/0154322 A1    Jun. 23, 2011

(51) Int. Cl.
*G06F 9/455* (2006.01)
*G06F 9/46* (2006.01)

(52) U.S. Cl.
USPC .............................................. 718/1; 718/104

(58) Field of Classification Search
USPC ........................................................... 718/1
See application file for complete search history.

(56) References Cited

U.S. PATENT DOCUMENTS

| | | | |
|---|---|---|---|
| 4,937,741 A * | 6/1990 | Harper et al. | 713/375 |
| 6,859,886 B1 * | 2/2005 | Johnson | 713/600 |
| 7,007,183 B2 | 2/2006 | Rawson, III et al. | |
| 7,290,260 B2 | 10/2007 | Miller | |
| 8,006,108 B2 * | 8/2011 | Brey et al. | 713/320 |
| 8,307,369 B2 * | 11/2012 | Tsushima et al. | 718/104 |
| 8,327,357 B2 * | 12/2012 | Amsden | 718/1 |
| 2004/0024923 A1 * | 2/2004 | Wygant | 710/1 |
| 2006/0206891 A1 | 9/2006 | Armstrong et al. | |
| 2008/0077927 A1 * | 3/2008 | Armstrong et al. | 718/104 |
| 2008/0215846 A1 | 9/2008 | Aman et al. | |
| 2009/0044188 A1 * | 2/2009 | Kanai et al. | 718/100 |
| 2009/0055830 A1 * | 2/2009 | Gusler et al. | 718/104 |
| 2009/0132840 A1 * | 5/2009 | Talwar et al. | 713/320 |
| 2009/0217283 A1 * | 8/2009 | Anand et al. | 718/104 |
| 2011/0154348 A1 * | 6/2011 | Elnozahy et al. | 718/104 |

OTHER PUBLICATIONS

Watts et al., "IBM Redbook—Implementing IBM Systems Director Active Energy Manager 4.1.1", Oct. 27, 2009, www.redbooks.ibm.com/redpieces/abstracts/sg247780.html?Open&pdfbookmark.*
Behle et al., "IBM Energy Scale for Power6 Processor-Based Systems," Oct. 15, 2009, ftp.support.lotus.com/common/.../POW03002USEN.PDF.*

* cited by examiner

*Primary Examiner* — Lewis A Bullock, Jr.
*Assistant Examiner* — Kevin X Lu
(74) *Attorney, Agent, or Firm* — Francis Lammes; Stephen J. Walder, Jr.; Matthew B. Talpis

(57) ABSTRACT

A mechanism is provided for temporarily allocating dedicated processors to a shared processor pool. A virtual machine monitor determines whether a temporary allocation associated with an identified dedicated processor is long-term or short-term. Responsive to the temporary allocation being long-term, the virtual machine monitor determines whether an operating frequency of the identified dedicated processor is within a predetermined threshold of an operating frequency of one or more operating systems utilizing the shared processor pool. Responsive to the operating frequency of the identified dedicated processor failing to be within the predetermined threshold, the virtual machine monitor either increases or decreases the frequency of the identified dedicated processor to be within the predetermined threshold of the operating frequency of the one or more operating systems utilizing the shared processor pool and temporarily allocates the identified dedicated processor to the shared processor pool.

19 Claims, 10 Drawing Sheets

PRESERVING A DEDICATED TEMPORARY ALLOCATION VIRTUALIZATION FUNCTION IN A POWER MANAGEMENT ENVIRONMENT

BACKGROUND

The present application relates generally to an improved data processing apparatus and method and more specifically to mechanisms for preserving dedicated temporary allocation virtualization functions in a power management environment.

There is an emerging customer requirement for better power and thermal management in server systems. Customers increasingly expect systems to behave in such a way as to be power-efficient. Customers also want the ability to set policies that trade off power and performance in order to meet their particular objectives. For example, customers want to be able to over-provision their installations relative to the nominal maximum power and temperature values of the systems that they install but be able to take advantage of the variability in workloads and utilization to ensure that the systems operate correctly and within the limits of the available power and cooling.

IBM®'s EnergyScale™ controls the power and temperature of running systems in a performance-aware manner under the direction of a set of policies and objectives specified through EnergyScale™'s user interfaces. To do so, EnergyScale™ implements detailed, periodic measurement of processor core power and temperature, measurement of the power consumed by the entire system board as well as any plugged-in processor cards and measurement of the memory power and temperature to the system. EnergyScale™ uses the results of these measurements to adjust the system's operation and configuration to meet specified objectives for power, temperature, and performance by using closed-loop feedback control operating in real time.

One of the tools used by EnergyScale™ to control power is to adjust the frequency and voltage of the processor chips and cores in the system to control the power dissipation as a function of the user specified energy scale policy. Early EnergyScale™ designs required that the voltage and frequency of all central processing units (CPUs) in the system maintained at the same value. As the EnergyScale™ design and implementation became more sophisticated, it became possible to have cores in a system running at different frequencies and voltages and allowed the implementation of more sophisticated power savings algorithms.

However, many multi-threaded applications are written assuming that all CPUs that the application runs on are running at the same frequencies and such applications may not function properly when running on processors at different frequencies. To avoid such application problems, one possible design is to run the processors of a logical partition at the same frequency. This design also requires that all processors in the shared pool run at the same frequency, because it is not possible with currently known technologies to monitor the work and change frequencies at the rate at which micro-partitions are dispatched.

SUMMARY

In one illustrative embodiment, a method, in a data processing system, is provided for temporarily allocating one or more dedicated processors to a shared processor pool. The illustrative embodiment sends an indication to a virtual machine monitor that an idle dedicated processor is available for temporary allocation to a shared processor pool, thereby forming an identified dedicated processor in response to processor temporary allocation being enabled in the logically partitioned data processing system. The illustrative embodiment determines whether the temporary allocation associated with the identified dedicated processor is long-term or short-term. The illustrative embodiment determines whether an operating frequency of the identified dedicated processor is within a predetermined threshold of an operating frequency of one or more operating systems utilizing the shared processor pool in response to the temporary allocation being long-term. The illustrative embodiment either increases or decreases the frequency of the identified dedicated processor to be within the predetermined threshold of the operating frequency of the one or more operating systems utilizing the shared processor pool in response to the operating frequency of the identified dedicated processor failing to be within the predetermined threshold of the operating frequency of the one or more operating systems utilizing the shared processor pool. The illustrative embodiment then allocates the identified dedicated processor to a shared processor pool.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In known dedicated temporarily allocation functions, a temporarily allocated central processing unit (CPU) may be running at a different frequency from CPUs of a shared processor pool. Current designs require that the frequency of the temporarily allocated CPU must be the same as the frequency of the processors of the shared processor pool. If the frequency difference between the CPU of the temporarily allocating partition and the shared processor pool is large, the time scale required to change the frequency to match the shared processor pool frequency may exceed the time scale of temporary allocation intervals, thus the temporary allocation function is defeated. Even if the temporary allocation is delayed when the temporarily allocated CPU is joining the shared processor pool, the temporarily allocating partition expects that the CPU becomes immediately available when the temporarily allocating partition has work to dispatch on the CPU. In general, once the temporarily allocating partition has work to dispatch on the temporarily allocated CPU, a delay of even a few milliseconds before the temporarily allocating partition can use the CPU again is unacceptable.

The illustrative embodiments provide a mechanism for allowing a temporarily allocated processor to be temporarily allocated to a shared processor pool operating at a different frequency to thereby preserve the dedicated temporary allocation virtualization function in a power management environment. In one illustrative embodiment, the dedicated temporarily allocation function is limited so that dedicated processor partitions and shared processor partitions may run at any frequency. In another illustrative embodiment, the range of frequencies at which the temporarily allocating and shared processor pool CPUs is limited so that temporary allocation of an idle CPU from a dedicated processor partition may occur.

Figure 1:
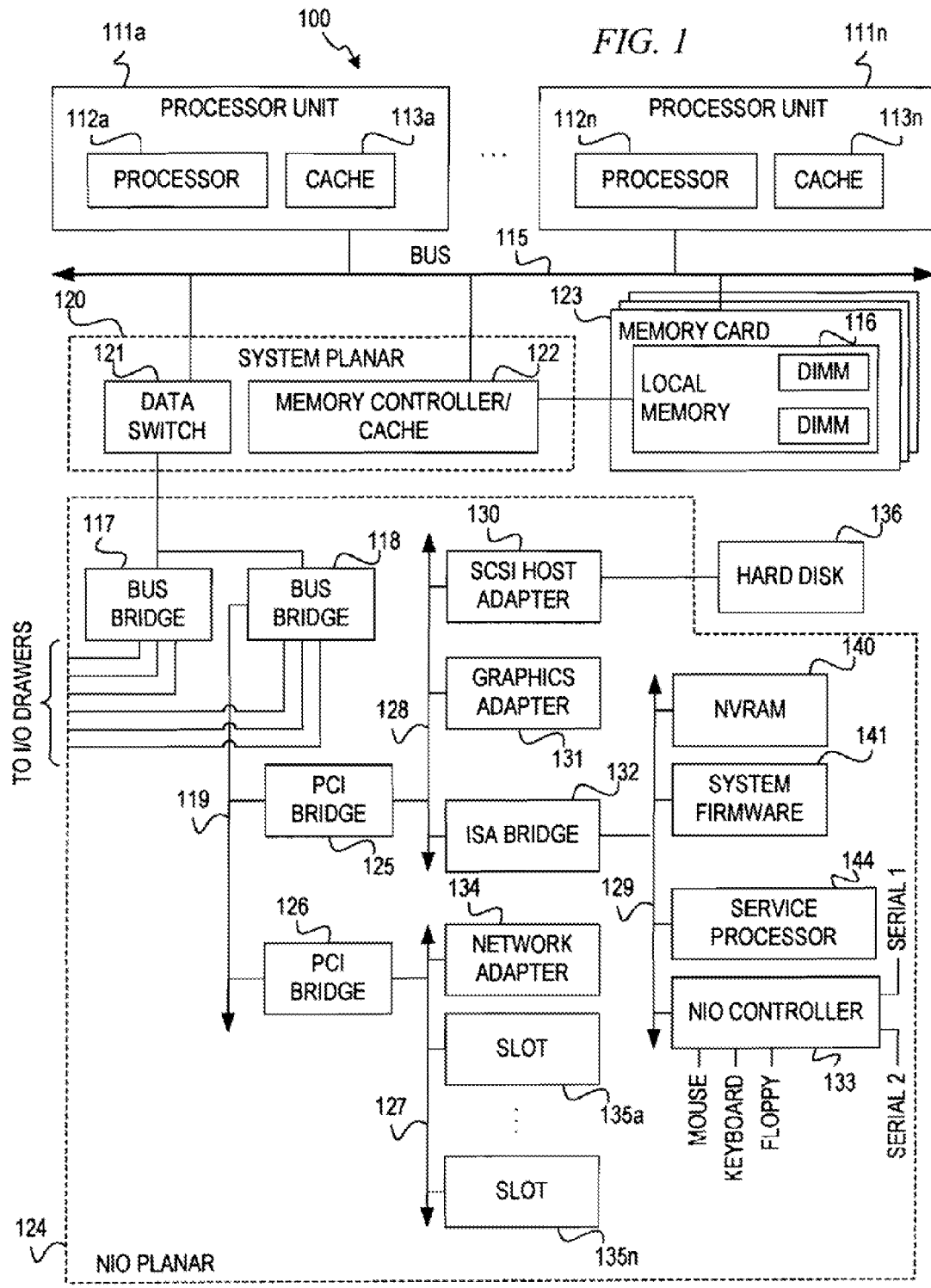
FIG. 1 depicts a block diagram of a data processing system with which aspects of the illustrative embodiments may advantageously be utilized.
Figure 2:
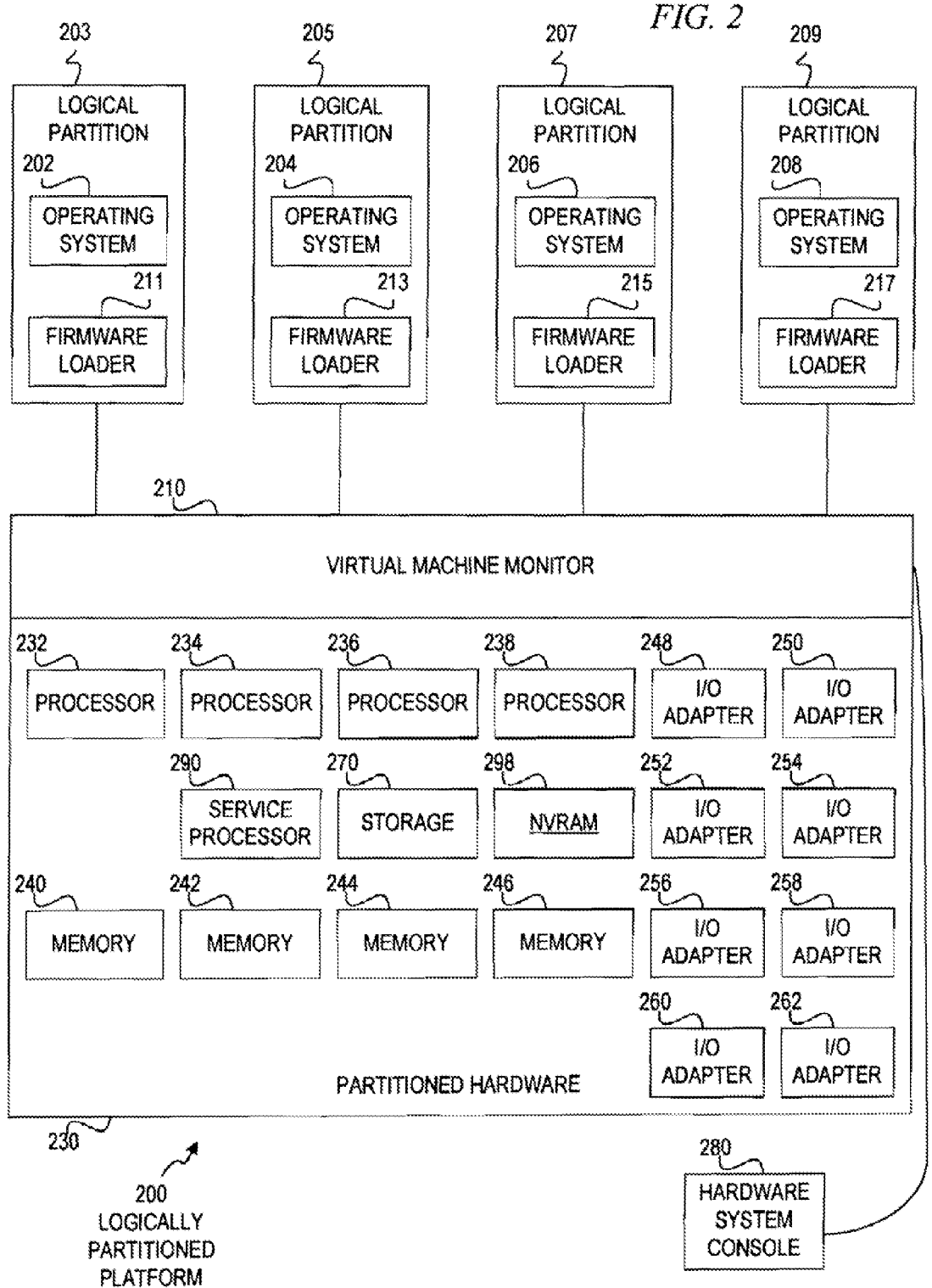
FIG. 2 depicts a block diagram of an exemplary logically partitioned platform in which the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism that allows a temporarily allocated processor to be temporarily allocated to a shared processor pool operating at a different frequency, this is only an example and is not intended to state or imply any limitation with regard to the features of the present invention. To the contrary, the illustrative embodiments are intended to include distributed data processing environments and embodiments in which a temporarily allocated processor may be allowed to temporarily allocate to a shared processor pool operating at a different frequency.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

In the illustrative embodiments, a computer architecture is implemented as a combination of hardware and software. The software part of the computer architecture may be referred to as microcode or millicode. The combination of hardware and software creates an instruction set and system architecture that the rest of the computer's software operates on, such as Basic Input/Output System (BIOS), Virtual Machine Monitors (VMM), Hypervisors, applications, etc. The computer architecture created by the initial combination is immutable to the computer software (BIOS, etc), except through defined interfaces which may be few.

Referring now to the drawings and in particular to FIG. 1, there is depicted a block diagram of a data processing system with which aspects of the illustrative embodiments may advantageously be utilized. As shown, data processing system 100 includes processor units 111*a*-111*n*. Each of processor units 111*a*-111*n* includes a processor and a cache memory. For example, processor unit 111*a* contains processor 112*a* and cache memory 113*a*, and processor unit 111*n* contains processor 112*n* and cache memory 113*n*.

Processor units 111*a*-111*n* are connected to main bus 115. Main bus 115 supports system planar 120 that contains processor units 111*a*-111*n* and memory cards 123. System planar 120 also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. Graphics adapter 131 may be directly or indirectly connected to PCI bus 128. PCI bridge 126 provides connections for external data streams through network adapter 134 and adapter card slots 135*a*-135*n* via PCI bus 127.

Industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140, connected to ISA bus 129, provides a non-volatile memory for preserving certain types of data from system disruptions or system failures, such as power supply problems. System firmware 141 is also connected to ISA bus 129 for implementing the initial Basic Input/Output System (BIOS) functions. Service processor 144 connects to ISA bus 129 to provide functionality for system diagnostics or system servicing.

The operating system (OS) is stored on hard disk 136, which may also provide storage for additional application software for execution by a data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel image on hard disk 136, loads the OS kernel image into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN). As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary logically partitioned platform is depicted in which the illustrative embodiments may be implemented. The hardware in logically partitioned platform 200 may be implemented, for example, using the hardware of data processing system 100 in FIG. 1.

Logically partitioned platform 200 includes partitioned hardware 230, operating systems 202, 204, 206, 208, and virtual machine monitor 210. Operating systems 202, 204, 206, and 208 may be multiple copies of a single operating system or multiple heterogeneous operating systems simultaneously run on logically partitioned platform 200. These operating systems may be implemented, for example, using OS/400, which is designed to interface with a virtualization mechanism, such as partition management firmware, e.g., a hypervisor. OS/400 is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Hypervisor software is an example of software that may be used to implement platform (in this example, virtual machine monitor 210) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logical partitions 203, 205, 207, and 209 also include partition firmware loader 211, 213, 215, and 217. Partition firmware loader 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by virtual machine monitor 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware.

Partitioned hardware 230 includes a plurality of processors 232-238, a plurality of system memory units 240-246, a plurality of input/output (I/O) adapters 248-262, and storage unit 270. Each of the processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Virtual machine monitor 210 performs a number of functions and services for logical partitions 203, 205, 207, and 209 to generate and enforce the partitioning of logical partitioned platform 200. Virtual machine monitor 210 is a firmware implemented virtual machine identical to the underlying hardware. Thus, virtual machine monitor 210 allows the simultaneous execution of independent OS images 202, 204, 206, and 208 by virtualizing all the hardware resources of logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through a hardware system console 280. Hardware system console 280 is a separate data processing system from which a system administrator may perform various functions including reallocation of resources to different logical partitions.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, without departing from the spirit and scope of the present invention.

Again, the issue with known dedicated temporarily allocation functions is that the temporarily allocated processor(s) may be running at a very different frequency from processors in a shared processor pool. The illustrative embodiments provide a mechanism for allowing a temporarily allocated processor to be temporarily allocated to a shared processor pool operating at a different frequency to thereby preserve the dedicated temporary allocation virtualization function in a power management environment.

Figure 3:
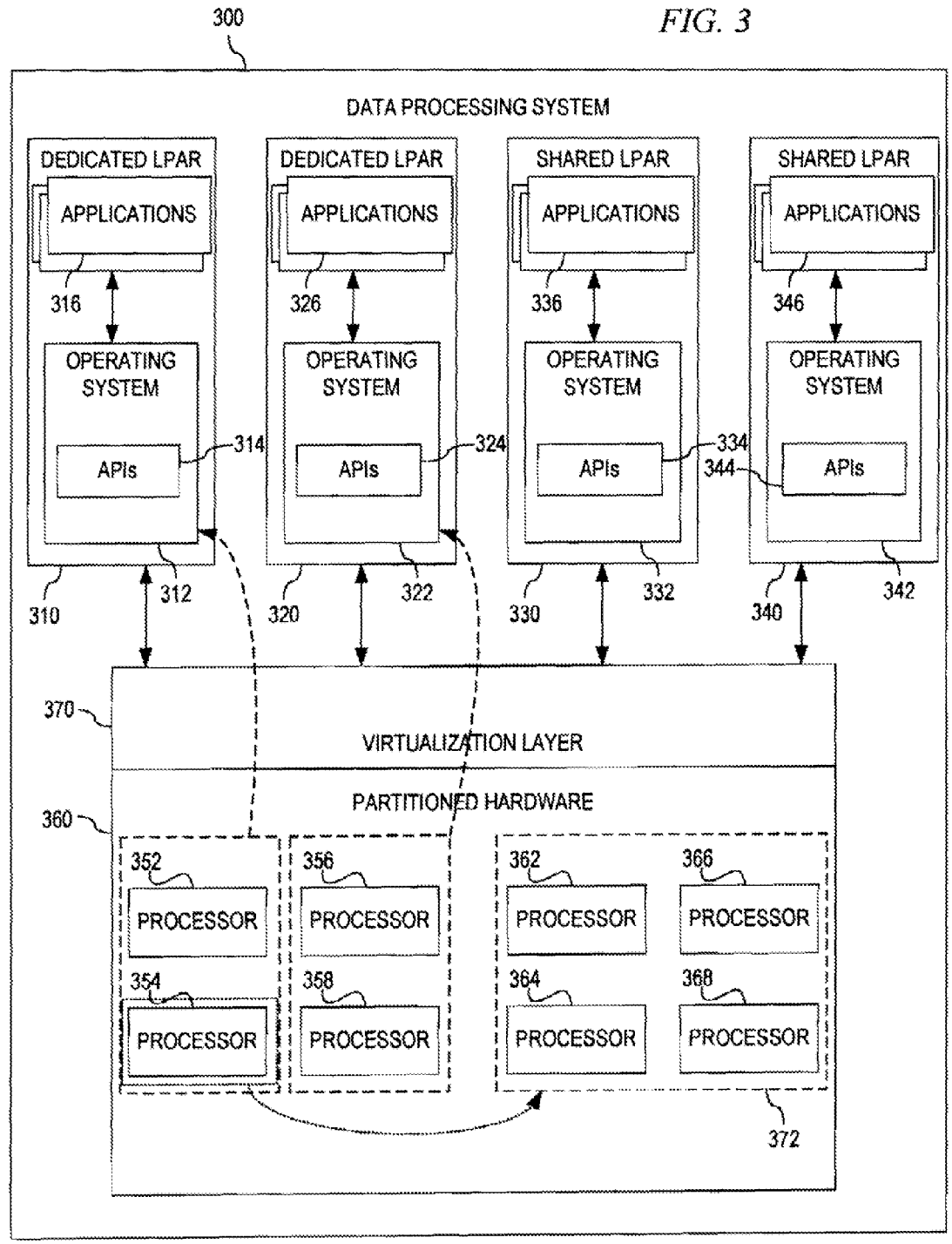
FIG. 3 depicts an exemplary block diagram illustrating a data processing system with a virtualized environment in accordance with an illustrative embodiment.

FIG. 3 depicts an exemplary block diagram illustrating a data processing system with a virtualized environment in accordance with an illustrative embodiment. Logically partitioned data processing system 300 has a plurality of logical partitions (LPARs) 310, 320, 330 and 340, which may also be referred to as clients or initiators. LPAR 310 has an instance of an operating system (OS) 312 with a set of application programming interfaces (APIs) 314 and one or more applications 316 running. LPAR 320 has OS 322 with APIs 324 and one or more applications 326. LPAR 330 has OS 332 with APIs 334 and one or more applications 336. LPAR 340 has OS 342 with APIs 344 and one or more applications 346. While logically partitioned data processing system 300 illustrates only LPARs 310, 320, 330, and 340, the illustrative embodiments are not limited to such. Rather, any number of LPARs may be utilized with the mechanisms of the illustrative embodiments without departing from the spirit and scope of the present invention.

LPARs 310, 320, 330, and 340 may communicate with one another through virtualization layer 370. Virtualization layer 370 may be software that performs communications and resource management to allow multiple instances of OSs 312, 322, 332, and 342 to run on logically partitioned data processing system 300 at the same time. Virtualization layer 370 performs tasks such as processor time slice sharing, memory allocation, or the like. Virtualization layer 370 may be, for example, a hypervisor or a virtual machine monitor, such as virtual machine monitor 210 or FIG. 2.

In this example, logically partitioned platform 300 may comprise dedicated LPARs 310 and 320, shared LPARs 330 and 340, and processors 352, 354, 356, 358, 362, 364, 366, and 368 within partitioned hardware 360 under control of virtualization layer 370. Processors 352 and 354 may be dedicated resources and may be assigned to dedicated LPAR 310 as whole units by virtualization layer 370. Processors 356 and 358 may also be dedicated resources and may be assigned to dedicated LPAR 320 as whole units by virtualization layer 370. However, processors 362, 364, 366, and 368 may be part of shared processor pool 372 and may be configured by virtualization layer 370 based on the requirements of shared LPARs 330 and 340. That is, virtualization layer 370 may allocate one or more of processors 362, 364, 366, and 368 from shared processor pool 372 to shared LPARs 330 and 340.

In allocating processors 352, 354, 356, 358, 362, 364, 366, and 368 to LPARs 310, 320, 330, and 340 each processor may be allocated and configured to run at the frequency of the OS executing on each of LPARs 310, 320, 330, and 340. For example, processors 352 and 354 allocated to LPAR 310 may be running at one frequency of OS 312, while processors 356 and 358 allocated to LPAR 320 may be running at a second frequency of OS 322, while processors 362, 364, 366, and 368 in the shared processor pool are running at a third frequency of OSs 332 and 342. However, when OS 312 and 322 on LPARs 310 and 320, respectively, have no work to perform on processors 352, 354, 356, or 358, one or more of the dedicated processors 352, 354, 356, and 358 may be temporarily allocated to shared processor pool 372.

In one illustrative embodiment, the temporary allocation of one or more of processors 352, 354, 356, and 358 by LPARs 310 or 320 is differentiated based on whether the processor is idle but not folded or idle as a result of folding. Processor folding is a technique used by an OS to steer work away from one or more of its allocated processors. That is, as the processor utilization of a partition decreases below a threshold, the OS will fold an allocated processor such that no work is dispatched and no interrupts are directed to the folded processor. Folding/unfolding decisions are evaluated by the OS on a time-scale of seconds. Processor folding in micro-partitions helps with the performance of the shared processor pool by reducing dispatching. Processor folding in dedicated processor partitions helps with power savings and/or improved temporary allocation to the shared processor pool.

As an example of the folding/unfolding decisions made by an operating system, an operating system, such as OS 312, evaluates whether folding is enabled on LPAR 310 every n seconds. If OS 312 determines that folding is enabled for LPAR 310, then OS 312 determines whether the workload for processors 352 and 354 is below a certain threshold. If OS 312 determines that the workload for processors 352 and 354 is below the predetermined threshold, then OS 312 chooses either processor 352 or 354, for this example processor 354, for folding and prevents any further workload to be queued up for processor 354, disables interrupts to processor 354, or the like, in order that processor 354 will finish all current workload and become idle. Alternatively, if OS 312 determines that processor 354 is folded and the workload for processor 352 is above a certain threshold, then OS 312 chooses processor 354 for unfolding, enables interrupts to processor 354, and allows work to be queued for processor 354, or the like.

Thus, in this illustrative embodiment, an allocated processors temporary allocation occurs when OS 312 and/or OS 322 has no work to do on their respectively allocated one or more of processors 352, 354, 356, and 358. A potential processor temporary allocation is "long-term" if the allocated processor is idle as a result of a processor folding and "short-term" if the allocated processor is idle but not folded. For a potential temporary allocation that is "long-term", the OS will tolerate long delays (up to hundreds of milliseconds) before it regains control of its allocated processor. This is because the OS makes folding decisions on a time-scale of seconds. For a potential temporary allocation that is a short-term, the temporarily allocating OS expects to gain immediately on the processor if the OS wants to execute work on its allocated processor.

For example, if OS 312 determines that the workload on processor 354 or LPAR 310 has dropped below a threshold, OS 312 may decide to fold the processor 354, as described above. When processor 354 becomes idle and the processors temporary allocation is enabled in data processing system 300, then OS 312 determines whether processor 354 is idle due to folding, then OS 312 sends an indication to virtualization layer 370 that processor 354 is available for a "long-term" temporary allocation. If OS 312 determines that processor 354 is idle but not due to folding, then OS 312 sends an indication to virtualization layer 370 that processor 354 is available for a "short-term" temporary allocation. Upon receiving the notification, virtualization layer 370 identifies the current operating frequency of processor 354.

In this illustrative embodiment, if the temporary allocation is a "long-term" temporary allocation, then virtualization layer 370 determines the operating frequency of the OSs utilizing shared processor pool 372 to which virtualization layer 370 is attempting to allocate processor 354. If the operating frequency of the OSs utilizing shared processor pool 372 is approximately equal as the operating frequency of processor 354, then virtualization layer 370 allocates processor 354 to shared processor pool 372. In the illustrative embodiments, the term approximately equal may mean that the operating frequency of processor 354 is within a predetermined threshold of the operating frequency of the OSs in the shared LPARs. If the operating frequency of the OSs utilizing shared processor pool 372 is not approximately equal to the operating frequency of processor 354, then virtualization layer 370 either increases or decreases the frequency of processor 354 to be approximately the same as the operating frequency of the OSs utilizing shared processor pool 372 and allocates processor 354 to shared processor pool 372.

If however, the temporary allocation is a "short-term" temporary allocation, then virtualization layer 370 determines the operating frequency of the OSs utilizing shared processor pool 372 to which virtualization layer 370 is attempting to allocate processor 354. If the operating frequency of the OSs utilizing shared processor pool 372 is approximately equal to the operating frequency of processor 354, then virtualization layer 370 allocates processor 354 to shared processor pool 372. If the operating frequency of the OSs utilizing shared processor pool 372 is not approximately equal to the operating frequency of processor 354, then virtualization layer 370 does not allocate processor 354. Whether shared processor pool 372 has been allocated to processor 354 on a "long-term" basis or a "short-term" basis, the OSs utilizing shared processor pool 372 may execute workload on processor 354 until a request is received in virtualization layer 370 from OS 312 indicating that the temporarily allocated processor is needed.

Upon receiving the notification, virtualization layer 370 determines whether the temporary allocation was "long-term" or "short-term". If the temporary allocation was "short-term", then virtualization layer 370 interrupts all work on processor 354 and hands control of processor 354 back to OS 312. If the temporary allocation was "long-term", virtualization layer 370 returns processor 354 to its original operating frequency, if needed, and hands control of processor 354 back to OS 312.

In another illustrative embodiment, the temporary allocation of one or more of processors 352, 354, 356, and 358 by LPARs 310 or 320 is also based on whether the potential processor temporary allocation is "long-term" if the allocated processor is idle as a result of a processor folding and "short-term" if the allocated processor is idle but not folded. However, some "short-term" temporary allocations may be allowed based on the difference between the operating frequency of the temporarily allocated processor and the operating frequency of the OSs utilizing shared processor pool 372 to which virtualization layer 370 is attempting to allocate processor 354.

Similar to the previous embodiment, if OS 312 determines that the workload on processor 354 has dropped below a threshold, OS 312 may decide whether the workload drop is a result of the processor 354 folding. If OS 312 determines that processor 354 is idle due to folding, then OS 312 sends an indication to virtualization layer 370 that processor 354 is available for a "long-term" temporary allocation. If OS 312 determines that processor 354 is idle but not due to folding, then OS 312 sends an indication to virtualization layer 370 that processor 354 is available for a "short-term" temporary allocation. Once OS 312 determines whether the temporary allocation is to be either "long-term" or "short-term", OS 312 sends a notification to virtualization layer 370. Upon receiving the notification, virtualization layer 370 identifies the current operating frequency of processor 354 (Fded) and the operating frequency of the OS in the shared LPAR (Fsha) to which virtualization layer 370 is attempting to allocate processor 354.

In this illustrative embodiment, if the operating frequency of the OSs utilizing shared processor pool 372 is approximately equal to the operating frequency of processor 354, then virtualization layer 370 allocates processor 354 both for a "long-term" basis and for a "short-term" potential temporary allocation. If the current operating frequency of processor 354 (Fded) is greater than the operating frequency of the OSs utilizing shared processor pool 372 (Fsha), then no temporary allocation occurs for a "short-term" potential temporary allocation. Temporary allocation does occur for a "long-term" potential temporary allocation. Virtualization layer 370 drops the frequency and the corresponding voltage of processor 354 to Fsha for the temporary allocation. Increasing the frequency takes a longer period of time because the OS may deal with processor 354 taking a second or so to recover to Fded and the time it takes to increase the frequency is tolerated by the OS. If the current operating frequency of processor 354 (Fded) is less than the operating frequency of the OSs utilizing shared processor pool 372 (Fsha), then temporary allocation occurs for potential "long-term" and "short-term" temporary allocation. Virtualization layer 370 increases the frequency to Fsha before temporary allocation occurs. The increase in frequency may take a longer period of time if voltage also has to be adjusted. However, the frequency is quickly dropped to Fded when the temporarily allocating LPAR wants to schedule work on the temporarily allocated processor.

Whether the shared LPAR has been allocated processor 354 on a "long-term" basis or a "short-term" basis, the shared LPAR may execute workload on processor 354 until a request is received in virtualization layer 370 from OS 312 indicating that the temporarily allocated processor is needed. Upon receiving the notification, virtualization layer 370 determines whether the temporary allocation was "long-term" or "short-term". If the temporary allocation was "short-term" and the frequency was not changed, then virtualization layer 370 interrupts all work on processor 354 and hands control of processor 354 back to OS 312. If the temporary allocation was "short-term" and the frequency was increased or changed, then virtualization layer 370 interrupts all work on processor 354, changes the frequency of processor 354 back to its original operating frequency, and hands control of processor 354 back to OS 312. For a "long-term" temporary allocation, after the temporarily allocating partition requests the temporarily allocated CPU back, virtualization layer 370 returns processor 354 to its original operating frequency, if needed, and hands control of processor 354 back to OS 312. For a "long-term" temporary allocation, virtualization layer 370 may leave the temporarily allocated processor in the shared processor pool until the current unit of work is completed and/or until some period of time expires because the temporarily allocating OS does not expect the CPU back immediately. If virtualization waits for some period of time to expire and the current unit of work has still not completed, then virtualization layer 370 may interrupt all work on processor 354, change the frequency of processor 354 back to its original operating frequency, and hand control of processor 354 back to OS 312. Additionally, if a condition arises requiring a "long-term" temporarily allocated processor to be immediately reclaimed, virtualization layer 370 may choose to reclaim processor 354 immediately, as in the case of a "short-term" temporary allocation, change the frequency of processor 354 back to its original operating frequency, if necessary, and hand control back to OS 312.

In yet another illustrative embodiment, virtualization layer 370 may be preprogrammed to always allow processor temporary allocation and, thus, maintain the operating frequencies of OSs within dedicated LPARS which are enabled to temporarily allocated processors (Fded) to be within a relative frequency (Δf) of the operating frequency of the OSs utilizing shared processor pool 372 (Fsha). The relative frequency (Δf) may be any frequency range where frequency is adjustable without changing the voltage. For example, virtualization layer 370 first determines whether dedicated LPARs 310 and 320 are enabled to temporarily allocate their dedicated processors 352, 354, 356, and 358, respectively, to shared processor pool 372. If virtualization layer 370 determines that LPARs 310 and 320 have processor temporary allocation enabled, then virtualization layer 370 determines an operating frequency of the OSs utilizing shared processor pool 372 (Fsha), an operating frequency of OS 312 in LPAR 310 ($Fded_1$), and an operating frequency of OS 322 in LPAR 320 ($Fded_2$). In order that processor temporary allocation may always occur such that changing frequency between $Fded_1$ and Fsha and/or $Fded_2$ and Fsha does not require voltage adjustments, virtualization layer 370 maintains the operating frequency of OS 312 in LPAR 310 ($Fded_1$) and the operating frequency of OS 322 in LPAR 320 ($Fded_2$) to be within a relative frequency ($\Delta f$) of the operating frequency of the OSs utilizing shared processor pool 372 (Fsha).

With virtualization layer 370 maintaining $Fded_1$ and $Fded_2$ to be within the relative frequency ($\Delta f$) of Fsha, virtualization layer 370 may make very rapid decreases and increases in the operating frequencies of processor 352, 354, 356, or 358 when temporarily allocating to shared processor pool 372 or when returning processor 352, 354, 356, or 358 back to OS 312 or 322. Virtualization layer 370 maintains the operating frequency of OS 312 in LPAR 310 ($Fded_1$) and the operating frequency of OS 322 in LPAR 320 ($Fded_2$) to be within a relative frequency ($\Delta f$) of the operating frequency of the OSs utilizing shared processor pool 372 (Fsha) and provides for always allowing temporary allocation both in "short-term" and "long-term" temporary allocations. However, the drawback of virtualization layer 370 maintaining $Fded_1$ and $Fded_2$ to be within Fsha is that power savings is not as dramatic if voltage cannot be adjusted.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Referring now to FIGS. 4-10, these figures provide flowcharts outlining example operations of temporarily allocating one or more dedicated processors to a shared processor pool in accordance with an illustrative embodiment. While the following figures are described in relation to only one processor being temporarily allocated to a shared processor pool, one of ordinary skill in the art would realize that the operation may be performed with any number of dedicated processor for any number of partitions without departing from the spirit and scope of the invention.

Figure 4:
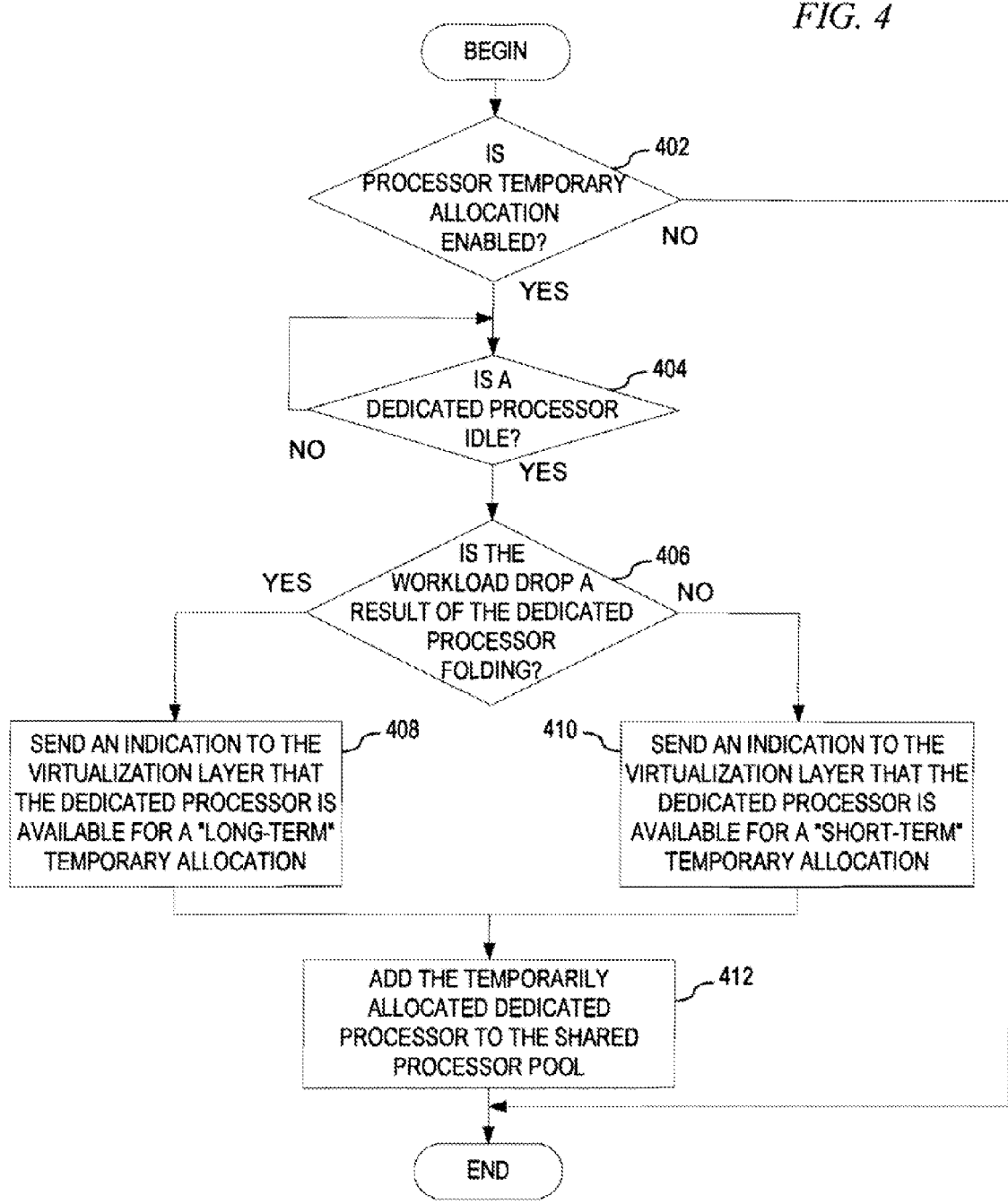
FIG. 4 depicts an example of the operation performed by an operating system (OS) of a dedicated logical partition (LPAR) and a virtualization layer in temporarily allocating one or more dedicated processors to a shared processor pool in accordance with an illustrative embodiment.

FIG. 4 depicts an example of the operation performed by an operating system (OS) of a dedicated logical partition (LPAR) and a virtualization layer in temporarily allocating one or more dedicated processors to a shared processor pool in accordance with an illustrative embodiment. As the operating begins, an OS of a dedicated LPAR determines whether processor temporary allocation in the data processing system is enabled (step 402). If at step 402 the OS determines that processor temporary allocation is not enabled, then the operation ends. If at step 402, processor temporary allocation is enabled in the data processing system, then the OS determines whether a dedicated processor in a plurality of dedicated processors is idle (step 404). If at step 404 the OS fails to identify a dedicated processor in the plurality of dedicated processors that is idle, then the operation returns to step 404. If at step 404 the OS identifies a dedicated processor that is idle, then the OS determines whether the dedicated processor being idle is a result of the dedicated processor folding (step 406). If at step 406 the OS determines that processor is idle due to folding, then the OS sends an indication to the virtualization layer that the dedicated processor is available for a "long-term" temporary allocation (step 408). If at step 406 the OS determines that dedicated processor is idle but not due to folding, then the OS sends an indication to the virtualization layer that the dedicated processor is available for a "short-term" temporary allocation (step 410). Upon receiving either notification, the virtualization layer adds the dedicated processor to the shared processor pool (step 412), with this part of the operation ending thereafter.

Figure 5:
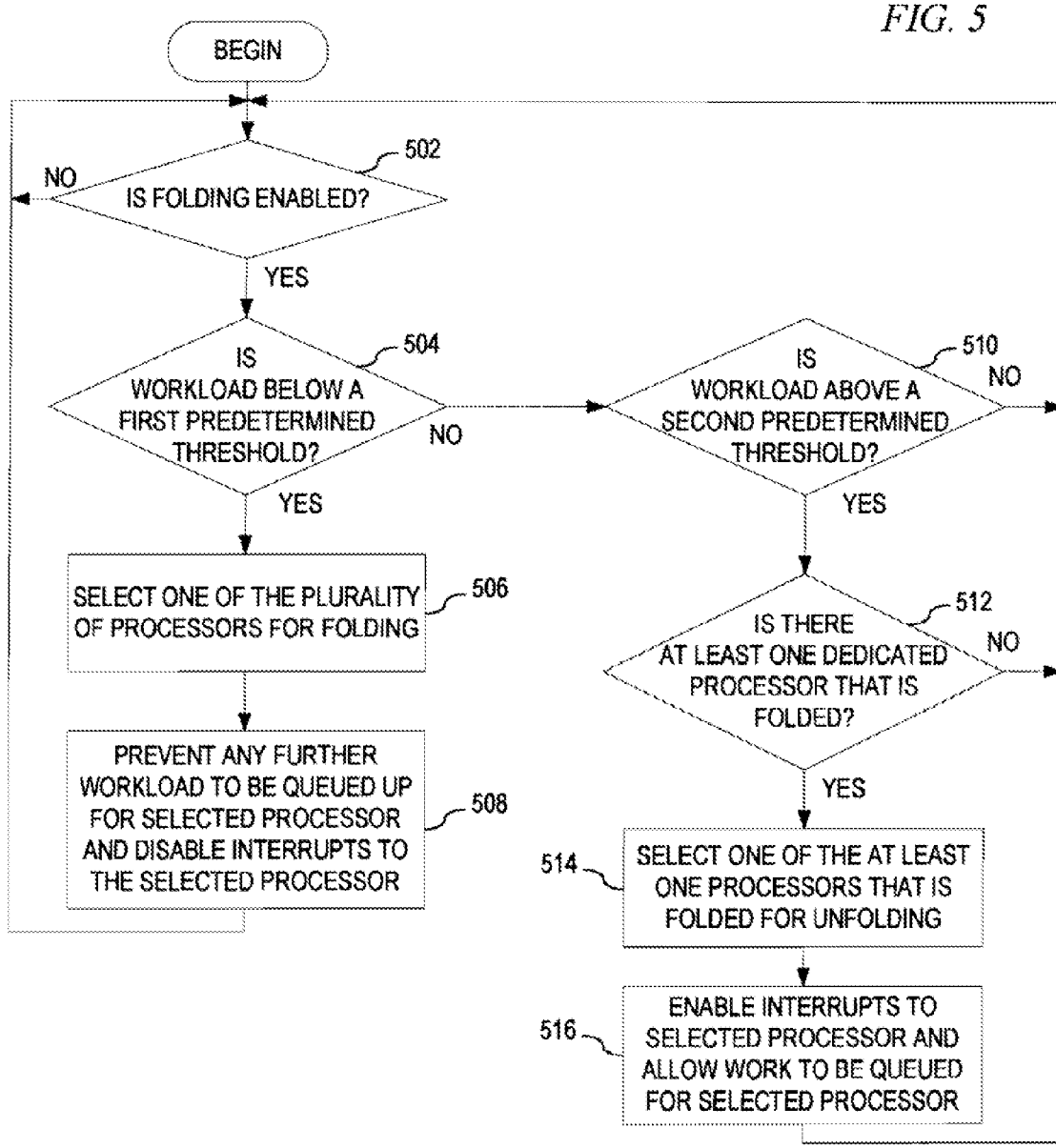
FIG. 5 depicts one example of an operation performed by an operating system (OS) in determining whether to fold or unfold a processor in accordance with an illustrative embodiment.

FIG. 5 depicts one example of an operation performed by an operating system (OS) in determining whether to fold or unfold a processor in accordance with an illustrative embodiment. As the operation begins, the OS evaluates whether folding is enabled every n seconds on the logical partition (LPAR) on which the OS is instantiated (step 502). If at step 502 the OS determines that folding is disabled, then the operation returns to step 502 for the next evaluation. If at step 502 the OS determines that folding is enabled for the LPAR, then the OS determines whether the workload for the plurality of dedicated processors dedicated to the LPAR is below a first predetermined threshold (step 504). If at step 504 the OS determines that the workload for the plurality of processors is below the first predetermined threshold, then the OS selects one of the plurality of processors for folding (step 506). The OS then prevents any further workload to be queued up for selected processor and disables interrupts to the selected processor (step 508), in order that the selected processor will finish all current workload and become idle, with the operation returning to step 502 thereafter.

If at step 504 the OS determines that the workload for the plurality of processors fails to be below the first predetermined threshold, then the OS determines whether the workload is above a second predetermined threshold (step 510). If at step 510 the OS determines that the workload fails to be above the second predetermined threshold, then the operation returns to step 502. If at step 510 the OS determines that the workload is above the second predetermined threshold, then the OS determines whether there is at least one dedicated processor that is folded (step 512). If at step 512 the OS determines that there is no dedicated processor that is folded, then the operation returns to step 502. If at step 512 the OS determines that there is at least one processor that is folded, then the OS selects one of the at least one processors that is folded for unfolding (step 514). The OS then may direct interrupts to the selected processor and allows work to be queued for selected processor (step 516), with the operation returning to step 502 thereafter.

Figure 6:
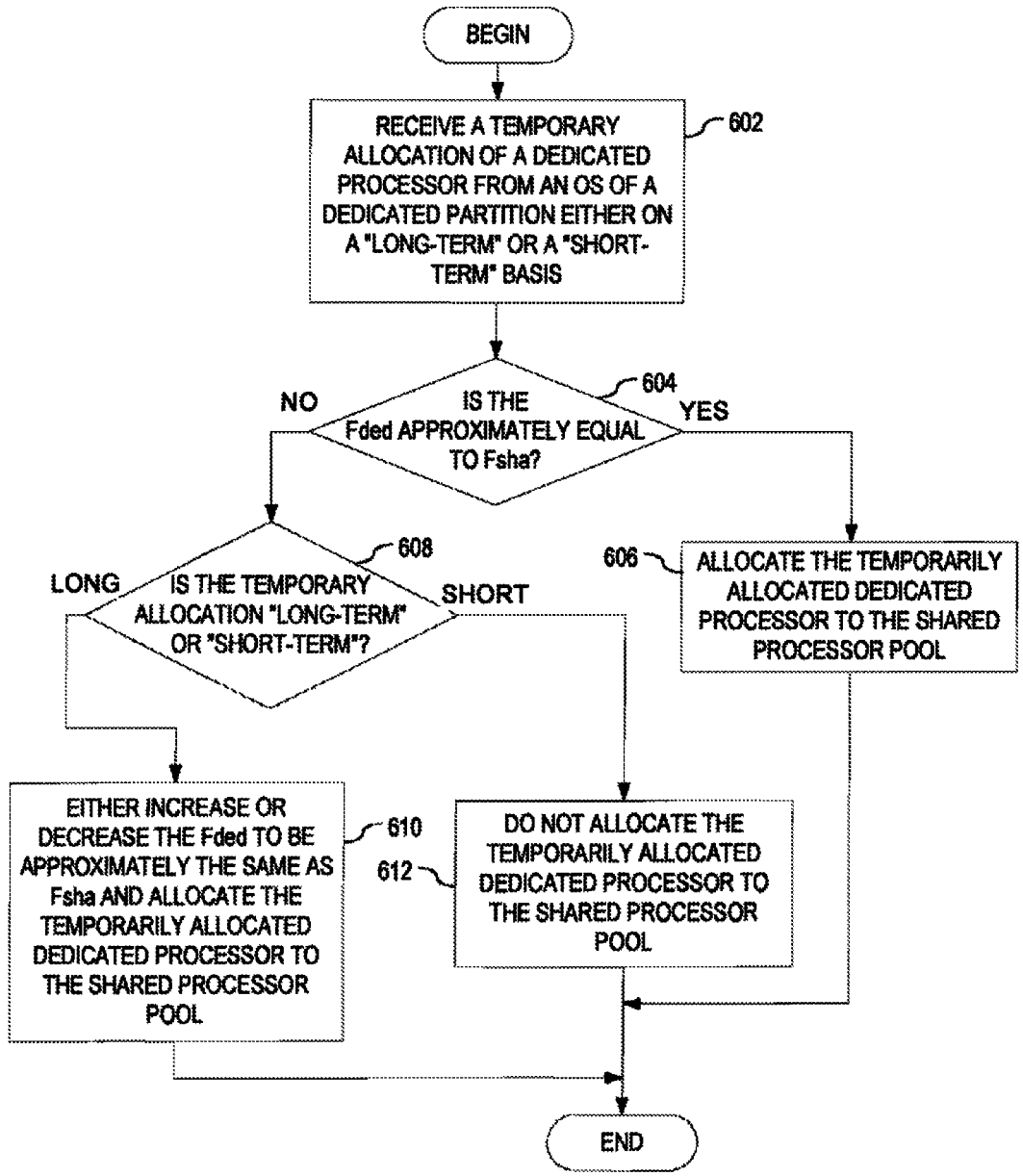
FIG. 6 depicts one example of an operation performed by a virtualization layer in allocating an identified dedicated processor in accordance with an illustrative embodiment.

FIG. 6 depicts one example of an operation performed by a virtualization layer in allocating an identified dedicated processor in accordance with an illustrative embodiment. As the operation begins, the virtualization layer receives a temporary allocation of an identified dedicated processor from an OS of a dedicated partition either on a "long-term" or a "short-term" basis (step 602). The virtualization layer then determines whether an operating frequency of the identified dedicated processor (Fded) is approximately equal to an operating frequency of the OSs utilizing the shared processor pool (Fsha) (step 604). If at step 604 the operating frequency of the identified dedicated processor is approximately equal to the operating frequency of the OSs utilizing the shared processor pool, then the virtualization layer allocates the identified dedicated processor to the shared processor pool (step 606), with the operation ending thereafter.

If at step 604 the operating frequency of the identified dedicated processor fails to be approximately equal to the operating frequency of the OSs utilizing the shared processor pool, the virtualization layer determines whether the temporary allocation of the dedicated processor is either a "long-term" temporary allocation or a "short-term" temporary allocation (step 608). If at step 608 the virtualization layer determines that the temporary allocation is a "long-term" temporary allocation, then the virtualization layer either increases or decreases the frequency of identified dedicated processor to be approximately the same as the operating frequency of the OSs utilizing shared processor pool and allocates identified dedicated processor on a "long-term" basis to the shared processor pool (step 610), with the operation ending thereafter. If at step 608 the virtualization layer determines that the temporary allocation is a "short-term" temporary allocation, then virtualization layer does not allocate the identified dedicated processor to the shared processor pool (step 612), with the operation ending thereafter.

Figure 7:
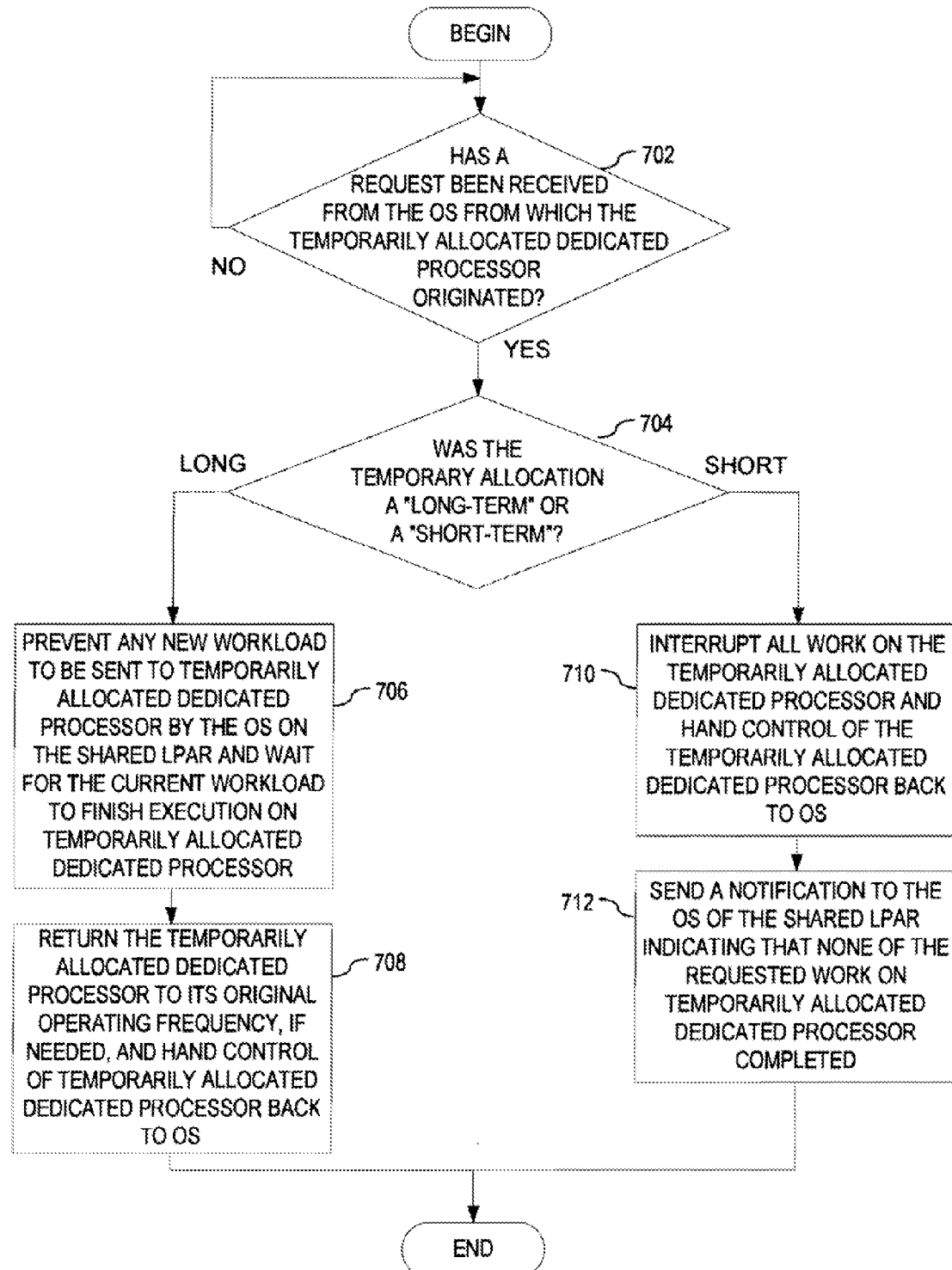
FIG. 7 depicts one example of an operation performed by a virtualization layer in deallocating an identified dedicated processor in accordance with an illustrative embodiment.

FIG. 7 depicts one example of an operation performed by a virtualization layer in deallocating an identified dedicated processor in accordance with an illustrative embodiment. As the operation begins, the virtualization layer determines whether a request has been received from the operating system (OS) from which the identified dedicated processor originated (step 702). If at step 702 the virtualization does not receive a request from the OS from which the identified dedicated processor originated, then the operation returns to step 702. If at step 702 the virtualization does receive a request from the OS from which the identified dedicated processor originated, then the virtualization determines whether the temporary allocation was a "long-term" or a "short-term" temporary allocation (step 704).

If at step 704 the virtualization layer determines that the temporary allocation was a "long-term" temporary allocation, then the virtualization layer prevents any new workload to be sent to identified dedicated processor by the OS on the shared logical partition (LPAR) and waits for the current workload to finish execution on identified dedicated processor (step 706). Once the workload is completed, the virtualization layer returns the identified dedicated processor to its original operating frequency, if needed, and hands control of identified dedicated processor back to OS (step 708), with the operation terminating thereafter. If at step 704 the virtualization layer determines that the temporary allocation was a "short-term" temporary allocation, then the virtualization layer interrupts all work on the identified dedicated processor and hands control of the identified dedicated processor back to OS (step 710). The virtualization layer then sends a notification to the OS of the shared LPAR indicating that none of the requested work on identified dedicated processor completed (step 712), with the operation terminating thereafter.

Figure 8:
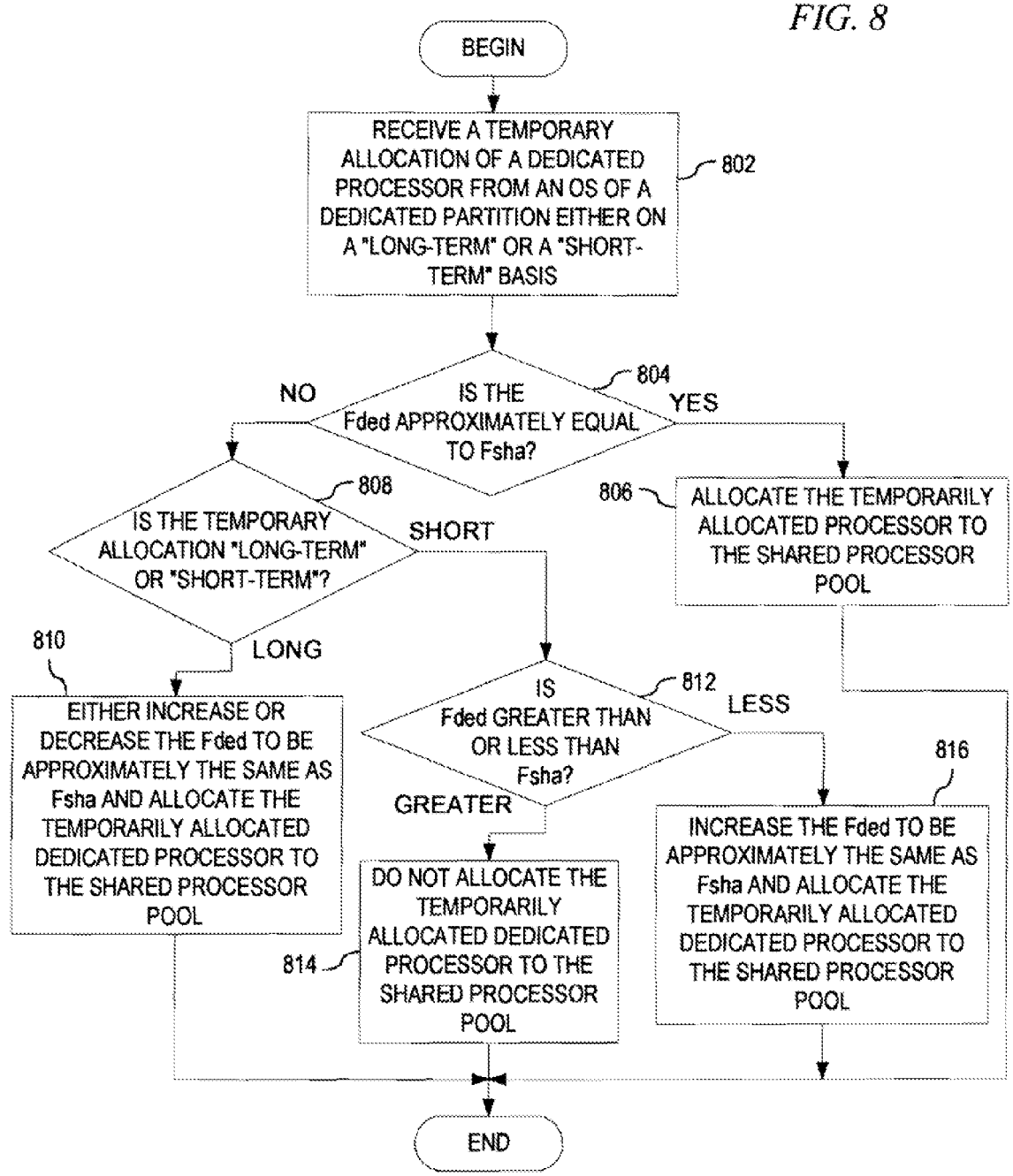
FIG. 8 depicts a second example of an operation performed by a virtualization layer in allocating an identified dedicated processor in accordance with an illustrative embodiment.

FIG. 8 depicts a second example of an operation performed by a virtualization layer in allocating an identified dedicated processor in accordance with an illustrative embodiment. As the operation begins, the virtualization layer receives a temporary allocation of a dedicated processor from an OS of a dedicated partition either on a "long-term" or a "short-term" basis (step 802). The virtualization layer then determines whether an operating frequency of the identified dedicated processor (Fded) is approximately equal to an operating frequency of the OSs utilizing the shared processor pool (Fsha) (step 804). If at step 804 the operating frequency of the identified dedicated processor is approximately equal to the operating frequency of the OSs utilizing the shared processor pool, then the virtualization layer allocates the identified dedicated processor to the shared processor pool (step 806), with the operation ending thereafter.

If at step 804 the operating frequency of the identified dedicated processor fails to be approximately equal to the operating frequency of the OSs utilizing the shared processor pool, the virtualization layer determines whether the temporary allocation of the dedicated processor is either a "long-term" temporary allocation or a "short-term" temporary allocation (step 808). If at step 808 the virtualization layer determines that the temporary allocation is a "long-term" temporary allocation, then the virtualization layer either increases or decreases the frequency of identified dedicated processor to be approximately the same as the operating frequency of the OSs utilizing the shared processor pool and allocates identified dedicated processor on a "long-term" basis to the shared processor pool (step 810), with the operation ending thereafter. If at step 808 the virtualization layer determines that the temporary allocation is a "short-term" temporary allocation, then the virtualization layer determines whether the operating frequency of the identified dedicated processor is greater than or less than the operating frequency of the OSs utilizing the shared processor pool (step 812).

If at step 812 the operating frequency of the identified dedicated processor is greater than the operating frequency of the OSs utilizing the shared processor pool, then the virtualization layer does not allocate the identified dedicated processor to the shared processor pool (step 814), with the operation ending thereafter. If at step 812 the operating frequency of the identified dedicated processor is less than the operating frequency of the OSs utilizing the shared processor pool, then the virtualization layer increases the frequency of identified dedicated processor to be approximately the same as the operating frequency of the OSs utilizing the shared processor pool and allocates identified dedicated processor on a "short-term" basis to the shared processor pool (step 816), with the operation ending thereafter.

Figure 9:
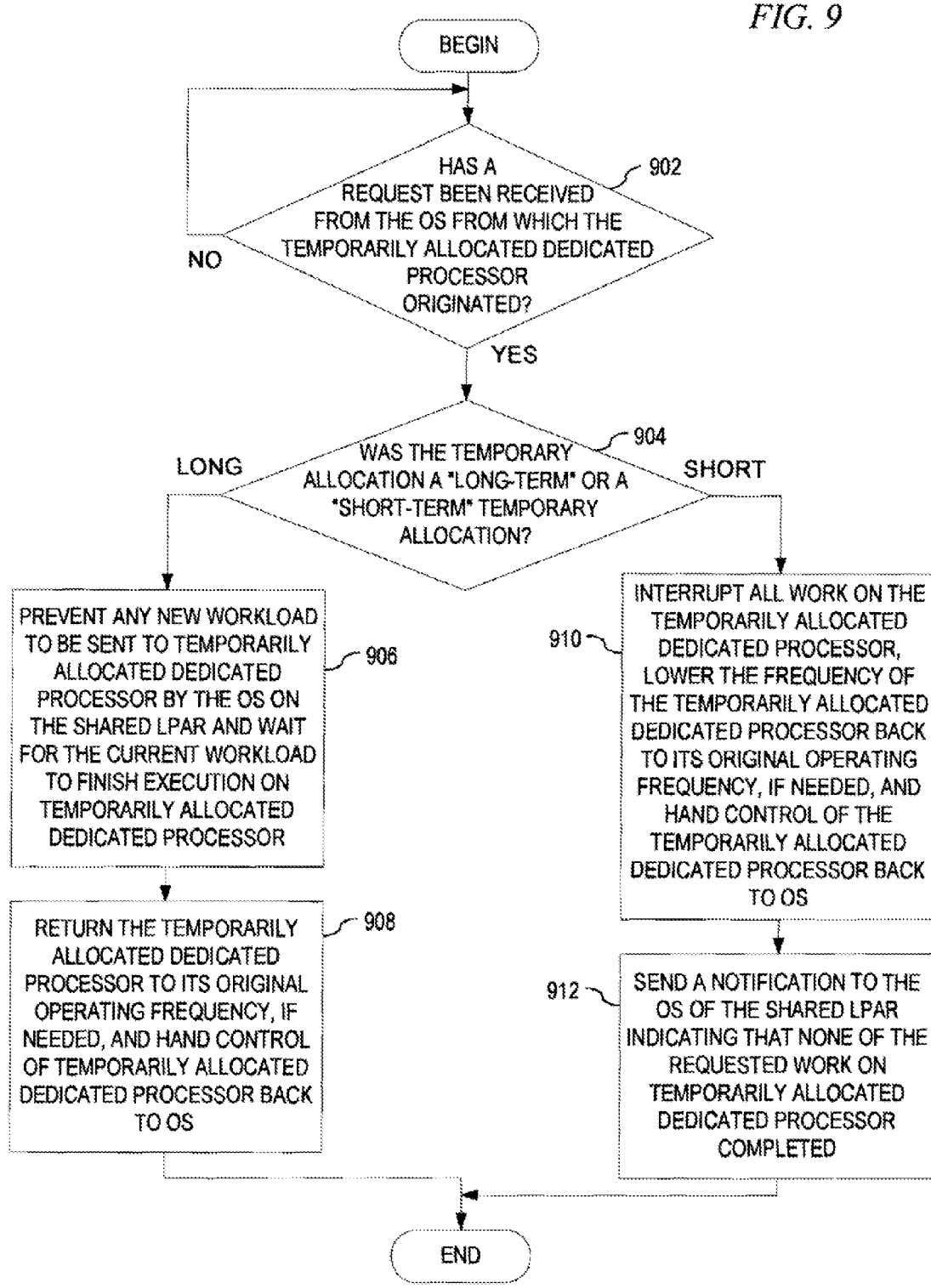
FIG. 9 depicts a second example of an operation performed by a virtualization layer in deallocating an identified dedicated processor in accordance with an illustrative embodiment.

FIG. 9 depicts a second example of an operation performed by a virtualization layer in deallocating an identified dedicated processor in accordance with an illustrative embodiment. As the operation begins, the virtualization layer determines whether a request has been received from the operating system (OS) from which the identified dedicated processor originated (step 902). If at step 902 the virtualization does not receive a request from the OS from which the identified dedicated processor originated, then the operation returns to step 902. If at step 902 the virtualization does receive a request from the OS from which the identified dedicated processor originated, then the virtualization determines whether the temporary allocation was a "long-term" or a "short-term" temporary allocation (step 904).

If at step 904 the virtualization layer determines that the temporary allocation was a "long-term" temporary allocation, then the virtualization layer prevents any new workload to be sent to the identified dedicated processor by the OS on the shared LPAR and waits for the current workload to finish execution on the identified dedicated processor (step 906). Once the workload is completed, the virtualization layer returns the identified dedicated processor to its original operating frequency, if needed, and hands control of identified dedicated processor back to OS (step 908), with the operation terminating thereafter. If at step 904 the virtualization layer determines that the temporary allocation was a "short-term" temporary allocation, then the virtualization layer interrupts all work on the identified dedicated processor, changes the frequency of the identified dedicated processor back to its original operating frequency, if needed, and hands control of the identified dedicated processor back to OS (step 910). The virtualization layer then sends a notification to the OS of the shared LPAR indicating that none of the requested work on identified dedicated processor completed (step 912), with the operation terminating thereafter.

Figure 10:
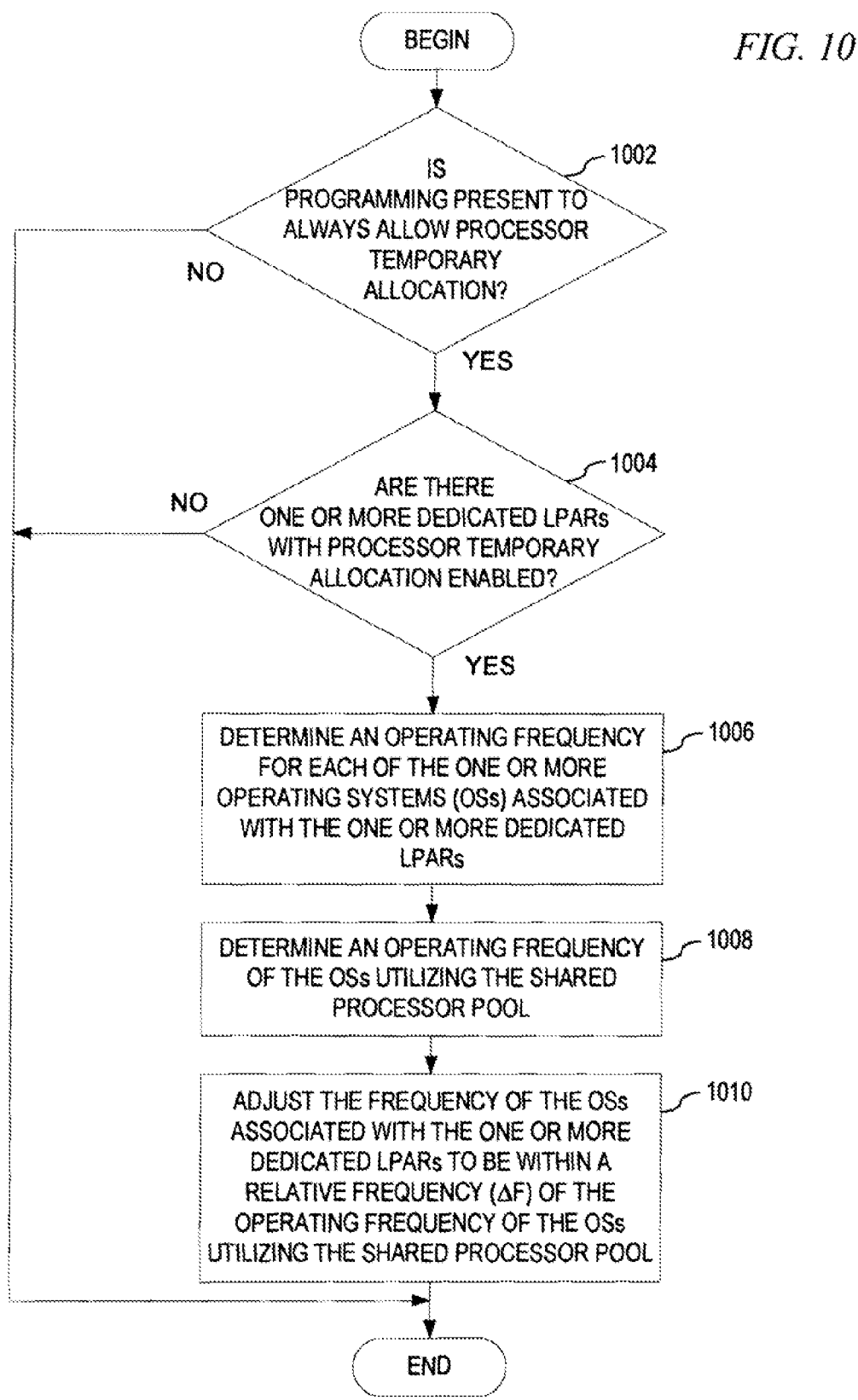
FIG. 10 depicts a example of an operation performed by a virtualization layer in maintaining the frequency of one or more identified dedicated processors to be within a frequency of a shared processor pool in accordance with an illustrative embodiment.

FIG. 10 depicts an example of an operation performed by a virtualization layer in maintaining the frequency of one or more identified dedicated processor to be within a frequency of a shared processor pool in accordance with an illustrative embodiment. As the operation begins, the virtualization layer determines if it is programmed to always allow processor temporary allocation (step 1002). If at step 1002 the virtualization layer determines that it is not programmed to always allow processor temporary allocation, then the operation ends. If at step 1002 the virtualization layer determines that it is programmed to always allow processor temporary allocation, then virtualization layer determines whether one or more dedicated logical partitions (LPARs) have processor temporary allocation enabled (step 1004). If at step 1004 there is not one or more dedicated LPARs that have processor temporary allocation enabled, then the operation ends. If at step 1004 there is one or more dedicated LPARs that have processor temporary allocation enabled, then the virtualization layer determines an operating frequency for each of the one or more operating systems (OSs) associated with the one or more dedicated LPARs (step 1006). The virtualization layer then determines an operating frequency of the OSs utilizing the shared processor pool (step 1008). The virtualization layer then adjusts the frequency of the OSs associated with the one or more dedicated LPARs to be within a relative frequency ($\Delta f$) of the operating frequency of the OSs utilizing the shared processor pool (step 1010) such that changing a frequency between the one or more of the dedicated processors associated with the one or more dedicated LPARs does not require a voltage adjustment when temporarily allocated to the shared processor pool in order that processor temporary allocation always occurs. After step 1010, the operation ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for allowing a temporarily allocated processor to be temporarily allocated to a shared processor pool operating at a different frequency to thereby preserve the dedicated temporary allocation virtualization function in a power management environment. In one illustrative embodiment, the dedicated temporarily allocation function is limited so that dedicated processor partitions and shared processor partitions may run at any frequency. In another illustrative embodiment, the range of frequencies at which the temporarily allocating and shared processor pool CPUs is limited so that temporary allocation of an idle CPU from a dedicated processor partition can always occur.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a logically partitioned data processing system, for temporarily allocating one or more dedicated processors to a shared processor pool, the method comprising:
   responsive to a dedicated logical partition in the logically partitioned data processing system being enabled to temporarily allocate one or more dedicated processors, sending, by a temporarily allocating operating system on the dedicated logical partition, an indication to a virtual machine monitor that an idle dedicated processor is available for temporary allocation to the shared processor pool, thereby forming all identified dedicated processor;
   determining, by the virtual machine monitor, whether the temporary allocation associated with the identified dedicated processor is long-term or short-term;
   responsive to the temporary allocation being long-term:
   determining, by the virtual machine monitor, whether a current-running operating frequency of the identified dedicated processor is within a predetermined threshold of a current-running operating frequency of one or more operating system utilizing the shared processor pool;
   responsive to the current-running operating frequency of the identified dedicated processor failing to be within the predetermined threshold of the current-running operating frequency of the one or more operating systems utilizing the shared processor pool, either increasing or decreasing, by the virtual machine monitor, an operating frequency of the identified dedicated processor to be within the predetermined threshold of the current-running operating frequency of the one or more operating systems utilizing the shared processor pool; and
   allocating, by the virtual machine monitor, the identified dedicated processor to the shared processor pool; and
   responsive to the temporary allocation being short-term:
   determining, by the virtual machine monitor, whether the current-running operating frequency of the identified dedicated processor is within the predetermined threshold of the current-running operating frequency of the one or more operating systems utilizing the shared processor pool; and
   responsive to the current-running operating frequency of the identified dedicated processor being within the predetermined threshold of the current-running operating frequency of the one or more operating systems utilizing the shared processor pool, allocating, by the virtual machine monitor, the identified dedicated processor to the shared processor pool.

2. The method of claim 1, further comprising:
   responsive to the current-running operating frequency of the identified dedicated processor being within the predetermined threshold of the current-running operating frequency of one or more operating systems utilizing the shared processor pool, allocating, by the virtual machine monitor, the identified dedicated processor to the shared processor pool.

3. The method of claim 1, further comprising:
   responsive to the temporary allocation being short-term and responsive to the current-running operating frequency of the identified dedicated processor failing to be within the predetermined threshold of the current-running operating frequency of the shared logical partition, denying, by the virtual machine monitor, the temporary allocation of the identified dedicated processor to the shared processor pool.

4. The method of claim 1, further comprising:
   responsive to the temporary allocation being short-term and responsive to the current-running operating frequency of the identified dedicated processor failing to be within the predetermined threshold of the current-running operating frequency of the one or more operating systems utilizing the shared processor pool, determining, by the virtual machine monitor, whether the current-running operating frequency of the identified dedicated processor is greater than the current-running operating frequency of the one or more operating systems utilizing the shared processor pool; and responsive to the current-running operating frequency of the identified dedicated processor being greater than the current-running operating frequency of the one or more operating systems utilizing the shared processor pool, denying, by the virtual machine monitor, the temporary allocation of the identified dedicated processor to the shared processor pool.

5. The method of claim 1, further comprising:

responsive to the temporary allocation being short-term and responsive to the current-running operating frequency of the identified dedicated processor failing to be within the predetermined threshold of the current-running operating frequency of the one or more operating systems utilizing the shared processor pool, determining, by the virtual machine monitor, whether the current-running operating frequency of the identified dedicated processor is greater than the current-running operating frequency of the one or more operating systems utilizing the shared processor pool;

responsive to the current-running operating frequency of the identified dedicated processor being less than the current-running operating frequency of the one or more operating systems utilizing the shared processor pool, increasing, by the virtual machine monitor, the current-running operating frequency of the identified dedicated processor to be within the predetermined threshold of the current-running operating frequency of the one or more operating systems utilizing the shared processor pool; and allocating, by the virtual machine monitor, the identified dedicated processor to the shared processor pool.

6. The method of claim 1, further comprising:

receiving, by the virtual machine monitor, a request from the temporarily allocating operating system requesting the identified dedicated processor to be returned;

determining, by the virtual machine monitor, whether the temporary allocation associated with the identified dedicated processor is long-term or short-term;

responsive to the temporary allocation being long-term, preventing, by the virtual machine monitor, any new workload to be sent to the identified dedicated processor;

waiting, by the virtual machine monitor, for the current workload to finish execution on the identified dedicated processor;

responsive to the current workload completing, returning, by the virtual machine monitor, the identified dedicated processor to an original operating frequency before temporary allocation to the shared processor pool; and handing, by the virtual machine monitor, control of the identified dedicated processor back to the temporarily allocating operating system.

7. The method of claim 6, further comprising:

responsive to the temporary allocation being short-term, interrupting, by the virtual machine monitor, all work on the identified dedicated processor;

returning, by the virtual machine monitor, the identified dedicated processor to the original operating frequency before the temporary allocation to the shared processor pool; and handing, by the virtual machine monitor, control of the identified dedicated processor back to the temporarily allocating operating system.

8. The method of claim 1, wherein the long-term temporary allocation is whether the identified dedicated processor is idle as a result of the identified dedicated processor folding and the short-term temporary allocation is whether the allocated processor is idle but not folded.

9. The method of claim 1, further comprising:

determining, by the virtualization layer, whether programming is present to always allow dedicated logical partitions in the logically partitioned data processing system to temporarily allocate one or more dedicated processors;

responsive to the programming being present to always allow the dedicated logical partitions in the logically partitioned data processing system to temporarily allocate one or more dedicated processors, determining, by the virtualization layer, whether the one or more dedicated logical partitions have been enabled to temporarily allocate one or more dedicated processors;

responsive to the one or more dedicated logical partitions being enabled to temporarily allocate one or more dedicated processors, determining, by the virtualization layer, a current-running operating frequency for each of the one-or more operating systems associated with the one or more dedicated logical partitions;

determining, by the virtualization layer, the current-running operating frequency of the operating systems utilizing the shared processor pool;

adjusting, by the virtualization layer, the current-running operating frequency of the one or more operating systems associated with the one or more dedicated logical partitions to be within a relative frequency ($\Delta f$) of the current-running operating frequency of the operating systems utilizing the shared processor pool, wherein the relative frequency ($\Delta f$) is a frequency range where frequency is adjustable without requiring voltage to be changed.

10. A computer program product comprising a non-transitory computer readable storage medium having a computer readable program stored therein, wherein the computer readable program, when executed on a computing device, causes the computing device to:

responsive to a dedicated logical partition in the logically partitioned data processing system being enabled to temporarily allocate one or more dedicated processors, send, an indication to a virtual machine monitor that an idle dedicated processor is available for temporary allocation to the shared processor pool, thereby forming all identified dedicated processor;

determine whether the temporary allocation associated with the identified dedicated processor is long-term or short-term;

responsive to the temporary allocation being long-term:
  determine whether a current-running operating frequency of the identified dedicated processor is within a predetermined threshold of a current-running operating frequency of one or more operating system utilizing the shared processor pool;
  responsive to the current-running operating frequency of the identified dedicated processor failing to be within the predetermined threshold of the current-running operating frequency of the one or more operating systems utilizing the shared processor pool, either increase or decrease an operating frequency of the identified dedicated processor to be within the predetermined threshold of the current-running operating frequency of the one or more operating systems utilizing the shared processor pool; and
  allocate the identified dedicated processor to the shared processor pool; and responsive to the temporary allocation being short-term:
   determine whether the current-running operating frequency of the identified dedicated processor is within the predetermined threshold of the current-running operating frequency of the one or more operating systems utilizing the shared processor pool; and
   responsive to the current-running operating frequency of the identified dedicated processor being within the predetermined threshold of the current-running operating frequency of the one or more operating systems utilizing the shared processor pool, allocate the identified dedicated processor to the shared processor pool.

11. The computer program product of claim 10, wherein the computer readable program further causes the computing device to:
   responsive to the temporary allocation being short-term and responsive to the current-running operating frequency of the identified dedicated processor failing to be within the predetermined threshold of the current-running operating frequency of the shared logical partition, deny the temporary allocation of the identified dedicated processor to the shared processor pool.

12. The computer program product of claim 10, wherein the computer readable program further causes the computing device to:
   responsive to the temporary allocation being short-term and responsive to the current-running operating frequency of the identified dedicated processor failing to be within the predetermined threshold of the current-running operating frequency of the one or more operating systems utilizing the shared processor pool, determine whether the current-running operating frequency of the identified dedicated processor is greater than the current-running operating frequency of the one or more operating systems utilizing the shared processor pool; and
   responsive to the current-running operating frequency of the identified dedicated processor being greater than the current-running operating frequency of the one or more operating systems utilizing the shared processor pool, deny the temporary allocation of the identified dedicated processor to the shared processor pool.

13. The computer program product of claim 10, wherein the computer readable program further causes the computing device to:
   responsive to the temporary allocation being short-term and responsive to the current-running operating frequency of the identified dedicated processor failing to be within the predetermined threshold of the current-running operating frequency of the one or more operating systems utilizing the shared processor pool, determine whether the current-running operating frequency of the identified dedicated processor is greater than the current-running operating frequency of the one or more operating systems utilizing the shared processor pool;
   responsive to the current-running operating frequency of the identified dedicated processor being less than the current-running operating frequency of the one or more operating systems utilizing the shared processor pool, increase the current-running operating frequency of the identified dedicated processor to be within the predetermined threshold of the current-running operating frequency of the one or more operating systems utilizing the shared processor pool; and
   allocate the identified dedicated processor to the shared processor pool.

14. The computer program product of claim 10, wherein the computer readable program further causes the computing device to:
   receive a request from the temporarily allocating operating system requesting the identified dedicated processor to be returned;
   determine whether the temporary allocation associated with the identified dedicated processor is long-term or short-term;
   responsive to the temporary allocation being long-term, prevent any new workload to be sent to the identified dedicated processor;
   wait for the current workload to finish execution on the identified dedicated processor;
   responsive to the current workload completing, return the identified dedicated processor to an original operating frequency before temporary allocation to the shared processor pool; and
   hand control of the identified dedicated processor back to the temporarily allocating operating system;
   responsive to the temporary allocation being short-term, interrupt all work on the identified dedicated processor;
   return the identified dedicated processor to the original operating frequency before the temporary allocation to the shared processor pool; and
   hand control of the identified dedicated processor back to the temporarily allocating operating system.

15. An apparatus, comprising:
   a processor; and
   a memory coupled to the processor, wherein the memory comprises instructions which, when executed by the processor, cause the processor to:
   responsive to a dedicated logical partition in the logically partitioned data processing system being enabled to temporarily allocate one or more dedicated processors, send, an indication to a virtual machine monitor that an idle dedicated processor is available for temporary allocation to the shared processor pool, thereby forming all identified dedicated processor;
   determine whether the temporary allocation associated with the identified dedicated processor is long-term or short-term;
   responsive to the temporary allocation being long-term:
      determine whether a current-running operating frequency of the identified dedicated processor is within a predetermined threshold of a current-running operating frequency of one or more operating system utilizing the shared processor pool;
      responsive to the current-running operating frequency of the identified dedicated processor failing to be within the predetermined threshold of the current-running operating frequency of the one or more operating systems utilizing the shared processor pool, either increase or decrease an operating frequency of the identified dedicated processor to be within the predetermined threshold of the current-running operating frequency of the one or more operating systems utilizing the shared processor pool; and
      allocate the identified dedicated processor to the shared processor pool; and
   responsive to the temporary allocation being short-term:
      determine whether the current-running operating frequency of the identified dedicated processor is within the predetermined threshold of the current-running operating frequency of the one or more operating systems utilizing the shared processor pool; and responsive to the current-running operating frequency of the identified dedicated processor being within the predetermined threshold of the current-running operating frequency of the one or more operating systems utilizing the shared processor pool, allocate the identified dedicated processor to the shared processor pool.

16. The apparatus of claim 15, wherein the instructions further cause the processor to:
responsive to the temporary allocation being short-term and responsive to the current-running operating frequency of the identified dedicated processor failing to be within the predetermined threshold of the current-running operating frequency of the shared logical partition, deny the temporary allocation of the identified dedicated processor to the shared processor pool.

17. The apparatus of claim 15, wherein the instructions further cause the processor to:
responsive to the temporary allocation being short-term and responsive to the current-running operating frequency of the identified dedicated processor failing to be within the predetermined threshold of the current-running operating frequency of the one or more operating systems utilizing the shared processor pool, determine whether the current-running operating frequency of the identified dedicated processor is greater than the current-running operating frequency of the one or more operating systems utilizing the shared processor pool; and
responsive to the current-running operating frequency of the identified dedicated processor being greater than the current-running operating frequency of the one or more operating systems utilizing the shared processor pool, deny the temporary allocation of the identified dedicated processor to the shared processor pool.

18. The apparatus of claim 15, wherein the instructions further cause the processor to:
responsive to the temporary allocation being short-term and responsive to the current-running operating frequency of the identified dedicated processor failing to be within the predetermined threshold of the current-running operating frequency of the one or more operating systems utilizing the shared processor pool, determine whether the current-running operating frequency of the identified dedicated processor is greater than the current-running operating frequency of the one or more operating systems utilizing the shared processor pool;
responsive to the current-running operating frequency of the identified dedicated processor being less than the current-running operating frequency of the one or more operating systems utilizing the shared processor pool, increase the current-running operating frequency of the identified dedicated processor to be within the predetermined threshold of the current-running operating frequency of the one or more operating systems utilizing the shared processor pool; and
allocate the identified dedicated processor to the shared processor pool.

19. The apparatus of claim 15, wherein the instructions further cause the processor to:
receive a request from the temporarily allocating operating system requesting the identified dedicated processor to be returned;
determine whether the temporary allocation associated with the identified dedicated processor is long-term or short-term;
responsive to the temporary allocation being long-term, prevent any new workload to be sent to the identified dedicated processor;
wait for the current workload to finish execution on the identified dedicated processor;
responsive to the current workload completing, return the identified dedicated processor to an original operating frequency before temporary allocation to the shared processor pool; and
hand control of the identified dedicated processor back to the temporarily allocating operating system;
responsive to the temporary allocation being short-term, interrupt all work on the identified dedicated processor;
return the identified dedicated processor to the original operating frequency before the temporary allocation to the shared processor pool; and
hand control of the identified dedicated processor back to the temporarily allocating operating system.

* * * * *